(12) United States Patent
Patel et al.

(10) Patent No.: US 10,513,025 B2
(45) Date of Patent: Dec. 24, 2019

(54) FORWARD-REVERSE VALVE AND PNEUMATIC TOOL HAVING SAME

(71) Applicant: Black & Decker Inc., Newark, DE (US)

(72) Inventors: Sandipkumar D. Patel, Rosedale, MD (US); Ross Arthur Billings, Reisterstown, MD (US); Andrew Joseph Birkel, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 389 days.

(21) Appl. No.: 15/603,109

(22) Filed: May 23, 2017

(65) Prior Publication Data

US 2018/0339406 A1   Nov. 29, 2018

(51) Int. Cl.
*B25F 5/00* (2006.01)
*B25D 9/08* (2006.01)
*B23Q 5/06* (2006.01)
*B25B 21/00* (2006.01)

(52) U.S. Cl.
CPC ............ *B25F 5/005* (2013.01); *B23Q 5/06* (2013.01); *B25B 21/00* (2013.01); *B25D 9/08* (2013.01); *B25F 5/00* (2013.01)

(58) Field of Classification Search
CPC .......... B25F 5/005; B23Q 5/06; B25B 21/00; B25D 9/08
USPC ................... 173/169, 200, 95, 95.3
See application file for complete search history.

(56) References Cited

U.S. PATENT DOCUMENTS

| 3,718,313 A | * | 2/1973 | Miller | B25B 21/00 251/290 |
| 3,833,068 A | * | 9/1974 | Hall | B25B 23/1453 173/169 |
| 3,989,113 A | * | 11/1976 | Spring, Sr. | B25B 21/00 173/221 |
| 5,377,769 A |   | 1/1995 | Hasuo et al. | |
| 5,918,686 A |   | 7/1999 | Izumisawa | |
| 6,062,323 A | * | 5/2000 | Pusateri | B25B 21/02 173/169 |
| 6,158,528 A |   | 12/2000 | Izumisawa | |
| 6,561,284 B2 |   | 5/2003 | Taga | |
| 6,634,438 B1 |   | 10/2003 | Pusateri et al. | |
| 6,708,779 B2 |   | 3/2004 | Taga | |
| 6,796,386 B2 |   | 9/2004 | Izumisawa et al. | |
| 6,880,645 B2 |   | 4/2005 | Izumisawa | |
| 7,237,622 B2 |   | 7/2007 | Liao | |

(Continued)

*Primary Examiner* — Nathaniel C Chukwurah
(74) *Attorney, Agent, or Firm* — Brake Hughes Bellermann LLP

(57) ABSTRACT

In a pneumatic-powered tool, a flow of air along a first or second flow path may be controlled by a position of air inlet guide surfaces of a rotatable valve relative to air inlet guide slots of a fixed valve sleeve. Air flowing along the first flow path may rotate a motor in a first direction to operate the tool in a forward mode. Air flowing along the second flow path may rotate the motor in the second direction to operate the tool in a reverse mode. In the forward mode, as air flows along the first flow path, air may be discharged along a primary discharge path, with a portion of the second flow path providing a secondary discharge path. In the reverse mode, as air flows along the second flow path, air may be discharged along the primary discharge path, with a portion of the first flow path providing the secondary discharge path.

20 Claims, 15 Drawing Sheets

(56) References Cited

U.S. PATENT DOCUMENTS

| | | |
|---|---|---|
| 7,404,450 B2 | 7/2008 | Izumisawa et al. |
| 7,802,633 B2 | 9/2010 | Kobayashi |
| 8,020,631 B2 | 9/2011 | Kobayashi |
| 8,375,832 B2 | 2/2013 | Chen |
| 8,647,084 B2 | 2/2014 | Chang |
| 2003/0121680 A1* | 7/2003 | Izumisawa .............. B25B 21/02 173/93.5 |
| 2004/0144553 A1 | 7/2004 | Ashbaugh |
| 2008/0230247 A1* | 9/2008 | Chen ........................ B25F 5/00 173/169 |
| 2014/0231111 A1 | 8/2014 | Lehnert et al. |
| 2016/0075008 A1 | 3/2016 | Wu et al. |
| 2016/0252108 A1 | 9/2016 | Nowak, Jr. et al. |
| 2016/0258291 A1 | 9/2016 | Griffin et al. |

\* cited by examiner

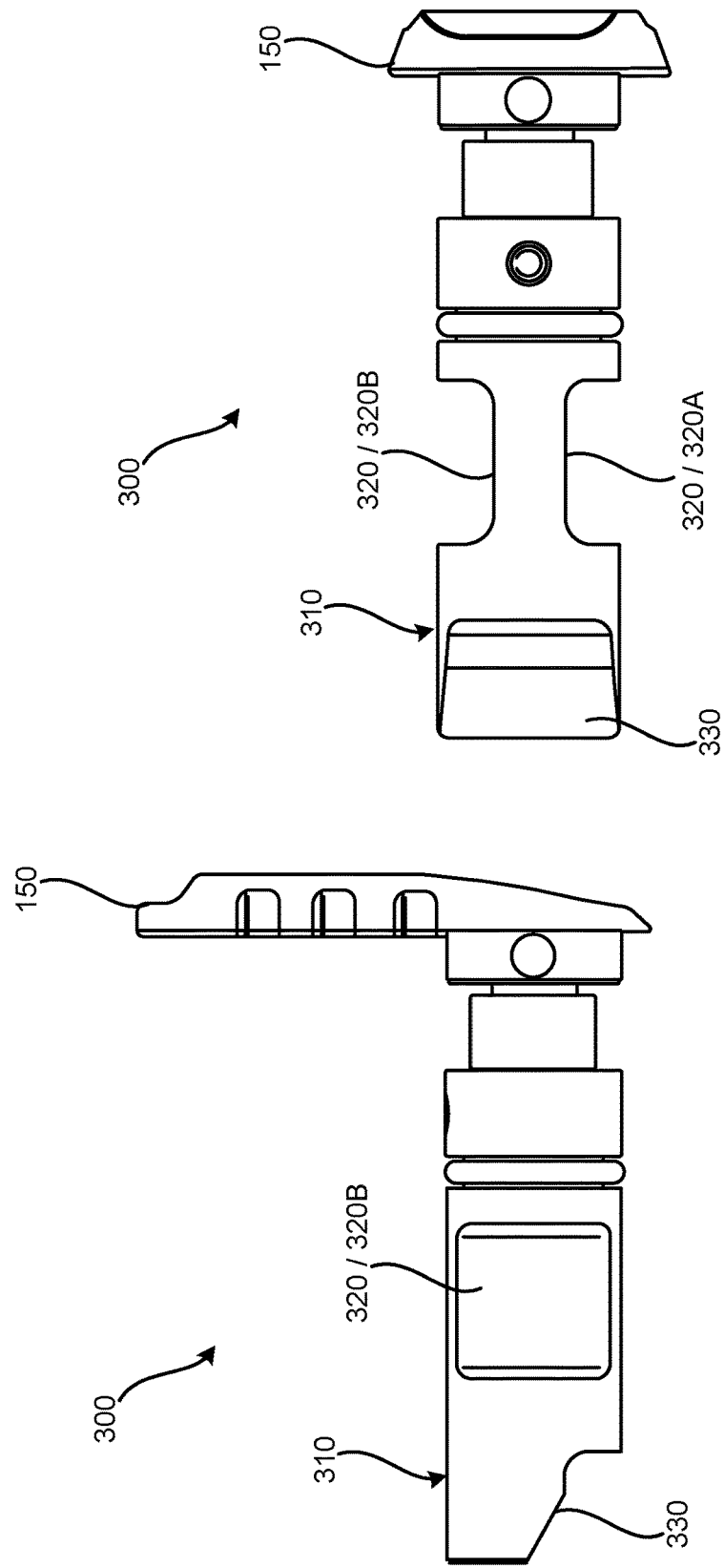

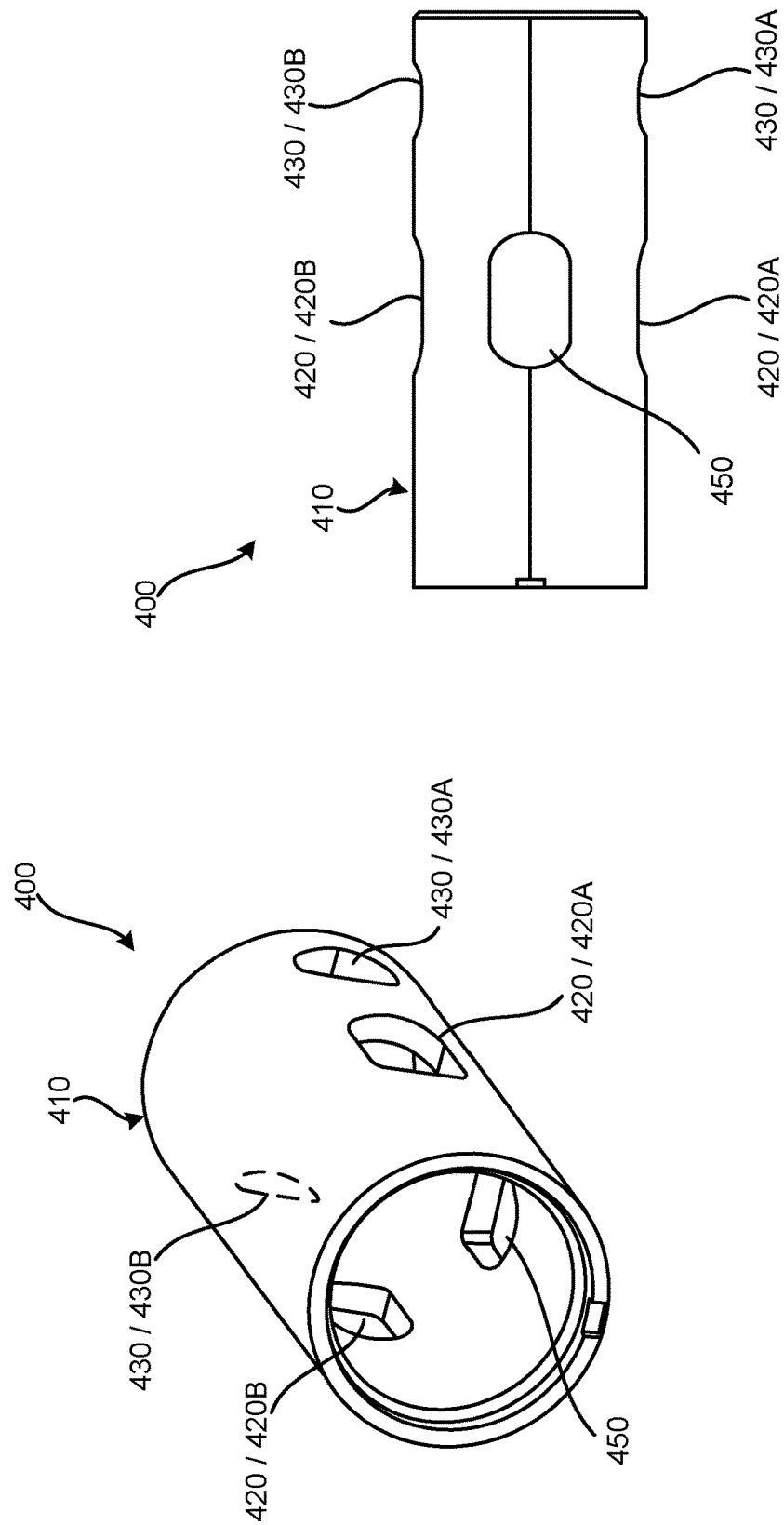

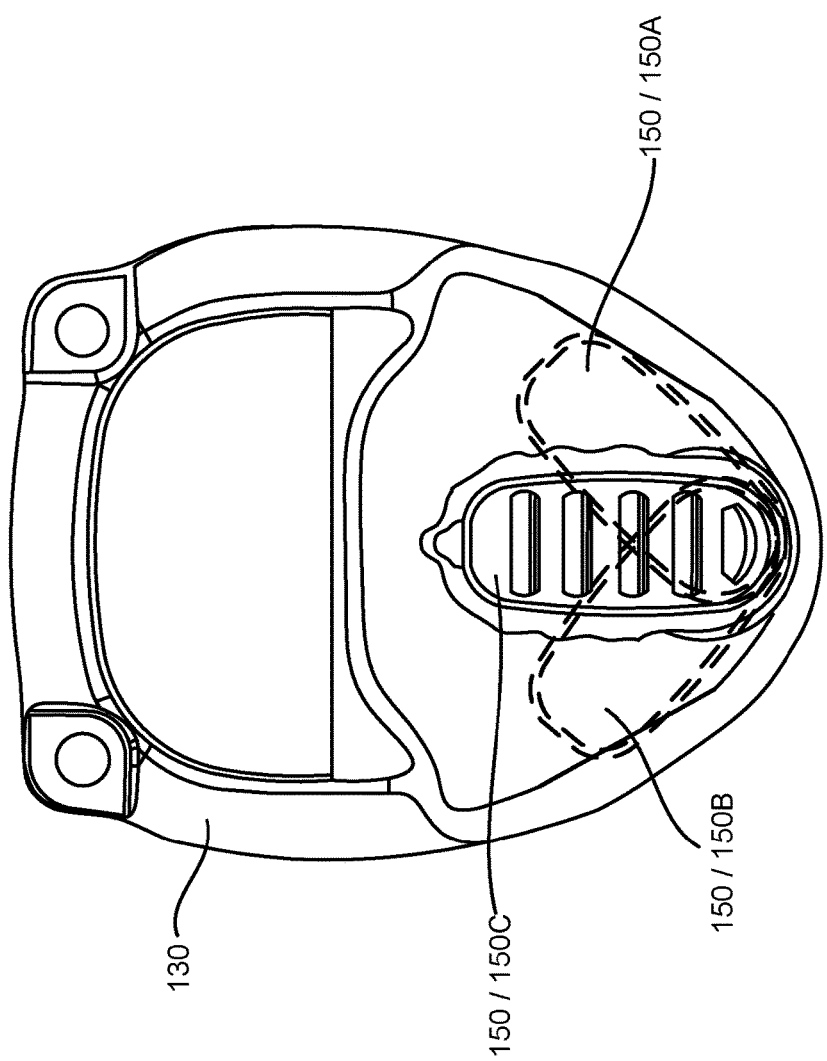

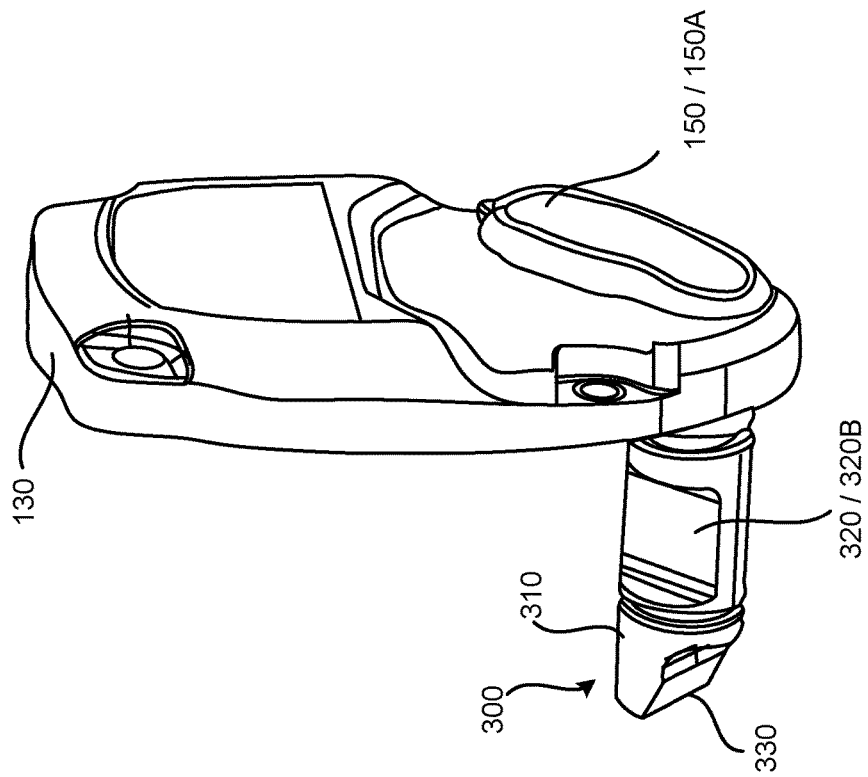
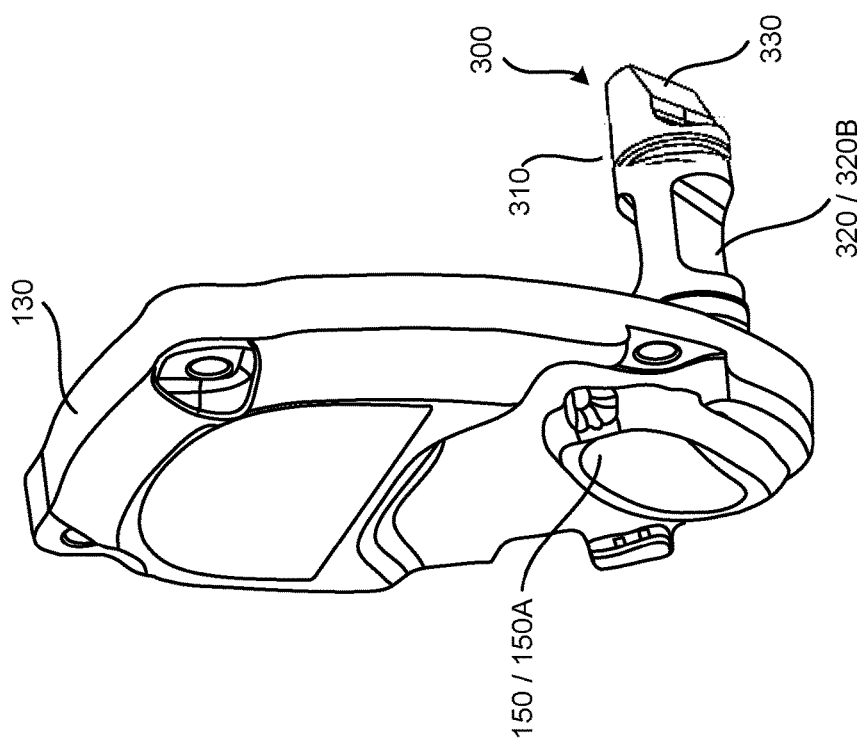
FIG. 5B
FIG. 5A

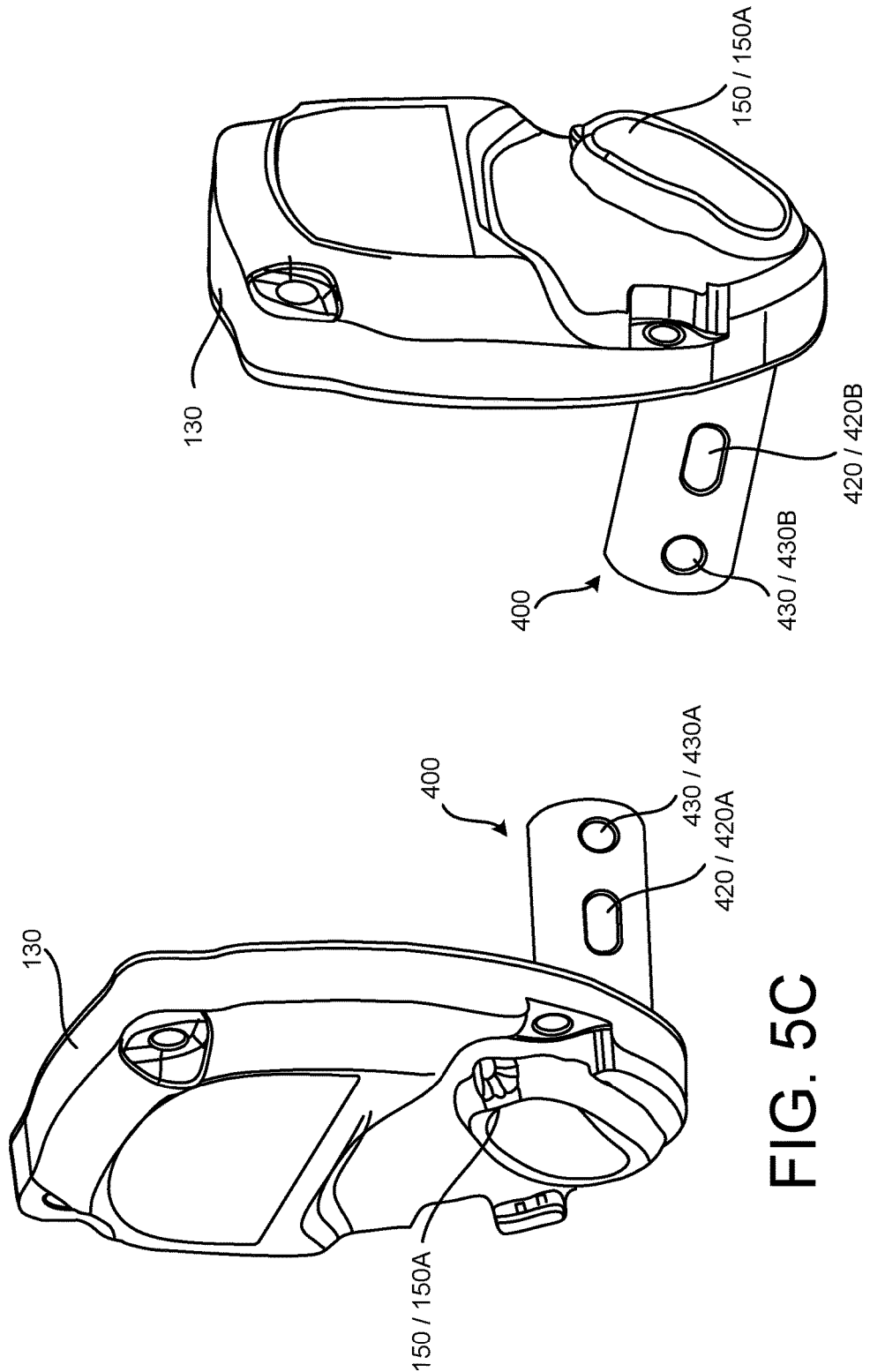

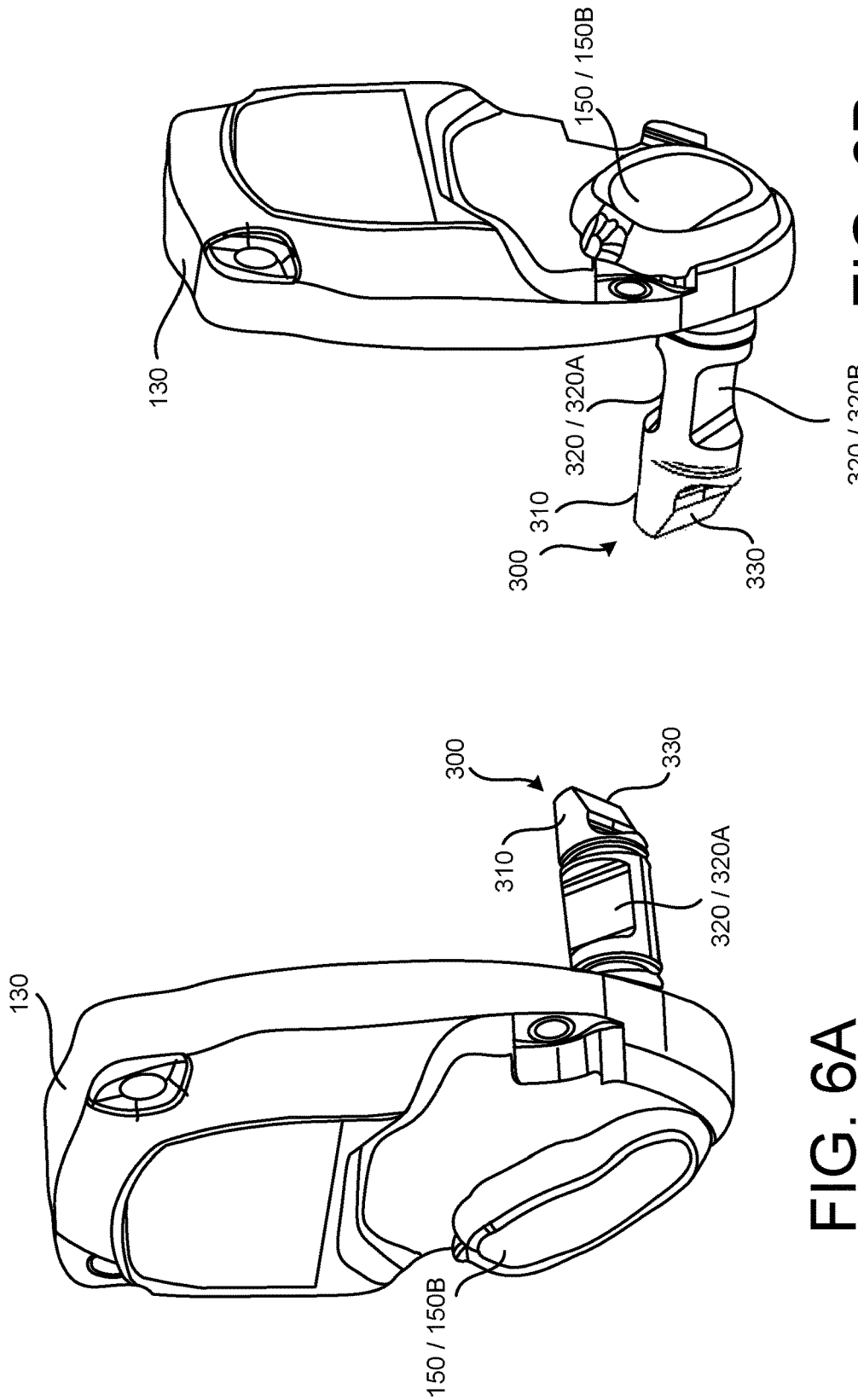

FORWARD-REVERSE VALVE AND PNEUMATIC TOOL HAVING SAME

FIELD

This document relates, generally, to a valve, and in particular, to a forward-reverse valve for a pneumatic tool.

BACKGROUND

Powered tools, and in particular, pneumatic tools, may be driven by compressed air provided by a compressed air source. An operation mode of the pneumatic tool, such as, for example, operation in a forward mode or a reverse mode, may be controlled by a direction of the flow of compressed air through the pneumatic tool. Efficient and effective control of the flow of the compressed air through the pneumatic tool may enhance performance of the tool, and may simplify use of the tool.

SUMMARY

In one aspect, a pneumatic-powered tool may include a housing, and a motor installed in the housing. The motor may include a rotor sleeve and a rotor rotatably positioned in the rotor sleeve. The tool may also include a valve assembly selectively providing compressed air to the motor. The valve assembly may include a valve sleeve received in the housing, and a valve rotatably received in the valve sleeve. The valve sleeve may include a main inlet slot defined in a bottom portion of the valve sleeve, a first inlet guide slot defined in a first side of the valve sleeve, a second inlet guide slot defined in a second side of the valve sleeve, a first discharge guide opening defined in the first side of the valve sleeve, and a second discharge guide opening defined in the second side of the valve sleeve. The valve may include a valve body, a first inlet guide surface defined in a first side of the valve body, a second inlet guide surface defined in a second side of the valve body, and a discharge guide surface defined by a chamfer at a distal end portion of the valve body.

In some implementations, the first inlet guide slot is defined in a first side of an intermediate portion of the valve sleeve, the second inlet guide slot is defined in a second side of the intermediate portion of the valve sleeve, the first discharge guide opening is defined in a first side of a distal end portion of the valve sleeve, the second discharge guide opening is defined in a second side of the distal end portion of the valve sleeve, and the main inlet is defined in the bottom portion of the valve sleeve, at a position corresponding to the first discharge guide opening and the second discharge guide opening. In some implementations, the second side of the intermediate portion of the valve sleeve is opposite the first side of the intermediate portion of the valve sleeve. In some implementations, the first inlet guide surface includes a flat transverse surface defined in a first side of an intermediate portion of the valve body, and the second inlet guide surface includes a flat transverse surface defined in a second side of the intermediate portion of the valve body. In some implementations, the second side of the intermediate portion of the valve body is opposite the first side of the intermediate portion of the valve sleeve. In some implementations, with the valve received in the valve sleeve, a position of the first inlet guide surface of the valve corresponds to a position of the first inlet guide slot of the valve sleeve, a position of the second inlet guide surface of the valve corresponds to a position of the second inlet guide slot of the valve sleeve, and a position of the discharge guide surface of the valve corresponds to a position of the first discharge guide opening and the second discharge guide opening of the valve sleeve.

In some implementations, the tool may also include a first rotor cap coupled to a first end portion of the rotor sleeve, a second rotor cap coupled to a second end portion of the rotor sleeve, the rotor sleeve, the first end cap and the second end cap defining a chamber in which the rotor is rotatably received, and a first air passage and a second air passage formed in the first rotor cap. In some implementations, the tool may include a first air channel defined in an end portion of the housing, extending between a first inlet and a first outlet formed in an interior facing side of the end portion of the housing, and a second air channel defined in the end portion of the housing, extending between a second inlet and a second outlet formed in the interior facing side of the end portion of the housing.

In some implementations, in a first position of the valve, the first inlet guide surface is aligned with the first inlet guide slot, so as to guide air from the valve through the first inlet guide slot, into the first air channel through the first inlet, and into the chamber through the first air passage, to rotate the rotor in a first direction, and the second inlet guide slot is blocked by a corresponding portion of the valve body. In some implementations, in the first position of the valve, the first discharge guide opening is blocked by a corresponding portion of the valve body, and the discharge guide surface is aligned with the second discharge guide opening, so as to guide air, discharged from the chamber through the second air passage and the second air channel, from the valve into a main discharge channel.

In some implementations, in a second position of the valve, the second inlet guide surface is aligned with the second inlet guide slot, so as to guide air from the valve through the second inlet guide slot, into the second air channel through the second inlet, and into the chamber through the second air passage, to rotate the rotor in a second direction, and the first inlet guide slot is blocked by a corresponding portion of the valve body. In some implementations, in the second position of the valve, the second discharge guide opening is blocked by a corresponding portion of the valve body, and the discharge guide surface is aligned with the first discharge guide opening, so as to guide air, discharged from the chamber through the first air passage and the first air channel, from the valve into a main discharge channel.

In some implementations, an area of the first inlet guide slot is greater than an area of the first discharge guide opening, an area of the first inlet guide slot is greater than an area of the second discharge guide opening, an area of the second inlet guide slot is greater than an area of the second discharge guide opening, and an area of the second inlet guide slot is greater than an area of the first discharge guide opening.

In another aspect, a pneumatic-powered tool may include a motor including a rotor rotatably coupled in a rotor chamber installed in a housing, a compressed air inlet and an air discharge outlet formed in the housing, a first air flow path defined in the housing, the first air flow path guiding compressed air to the rotor chamber to rotate the rotor in a first direction, a second air flow path defined in the housing, the second air flow path guiding compressed air to the rotor chamber to rotate the rotor in a second direction, and a valve assembly selectively controlling a supply of compressed air from the compressed air inlet to the first air flow path or the second air flow path. The valve assembly may include a valve sleeve installed in the housing, and a valve body rotatably received in the valve sleeve. In a first position of the valve body relative to the valve sleeve, a first inlet guide surface defined in a first side of the valve body is aligned with a first inlet guide slot defined in a first side of the valve sleeve so as to guide compressed air out of the valve assembly through the first inlet guide slot and into the first air flow path, and a second inlet guide slot defined in a second side of the valve sleeve is blocked by a corresponding portion of the valve body. In a second position of the valve body relative to the valve sleeve, a second inlet guide surface defined in a second side of the valve body is aligned with the second inlet guide slot defined in the second side of the valve sleeve so as to guide compressed air out of the valve assembly through the second inlet guide slot and into the second air flow path, and the first inlet guide slot defined in the first side of the valve sleeve is blocked by a corresponding portion of the valve body.

In some implementations, in the first position of the valve body relative to the valve sleeve, a first discharge guide opening defined in the first side of the valve sleeve is blocked by a corresponding portion of the valve body, and a discharge guide surface defined by a chamfered surface at a distal end portion of the valve body is aligned with a second discharge guide opening defined in the second side of the valve sleeve, so as to guide residual air, discharged from the chamber, into a main discharge channel, and in the second position of the valve body relative to the valve sleeve, a second discharge guide opening defined in the second side of the valve sleeve is blocked by a corresponding portion of the valve body, and the discharge guide surface is aligned with a first discharge guide opening defined in the first side of the valve sleeve, so as to guide residual air, discharged from the chamber, into the main discharge channel.

In some implementations, the first inlet guide surface includes a flat transverse surface defined in a first side of an intermediate portion of the valve body, and the second inlet guide surface includes a flat transverse surface defined in a second side of the intermediate portion of the valve body, opposite the first side thereof. In some implementations, the valve body is symmetric with respect to a vertical plane defined by a longitudinal axis of the valve body, and the valve sleeve is symmetric with respect to a vertical plane defined by a longitudinal axis of the valve sleeve.

In some implementations, the first flow path includes a primary discharge path and a secondary discharge path, wherein the primary discharge path is defined by a plurality of primary air discharge openings formed in a wall of the chamber, the plurality of primary air discharge openings guiding air from the chamber into a main discharge channel for discharge from the housing through the air discharge outlet, and the secondary discharge path guides residual air from an upper portion of the chamber, through a secondary discharge channel formed in the housing, into the valve, wherein the discharge guide surface guides the residual air from the valve into the main discharge channel through the second discharge opening in the valve sleeve. In some implementation, the second flow path includes a primary discharge path and a secondary discharge path, wherein the primary discharge path is defined by a plurality of primary air discharge openings formed in a wall of the chamber, the plurality of primary air discharge openings guiding air from the chamber into a main discharge channel for discharge from the housing through the air discharge outlet, and the secondary discharge path guides residual air from an upper portion of the chamber, through a secondary discharge channel formed in the housing, into the valve, where the discharge guide surface of the valve body guides the residual air from the valve into the main discharge channel through the first discharge opening in the valve sleeve.

In some implementations, an area of the first inlet guide slot is greater than an area of the first discharge guide opening, an area of the first inlet guide slot is greater than an area of the second discharge guide opening, an area of the second inlet guide slot is greater than an area of the second discharge guide opening, and an area of the second inlet guide slot is greater than an area of the first discharge guide opening.

The details of one or more implementations are set forth in the accompanying drawings and the description below. Other features will be apparent from the description and drawings, and from the claims.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings:

FIGS. 2A-2B illustrate an exemplary valve of an exemplary pneumatic-powered tool, in accordance with implementations described herein.

FIGS. 3A-3B illustrate an exemplary valve sleeve of an exemplary pneumatic-powered tool, in accordance with implementations described herein.

FIGS. 4A-4C illustrate an exemplary valve of an exemplary pneumatic-powered tool, in a neutral position, in accordance with implementations described herein.

FIGS. 5A-5D illustrate an exemplary valve assembly of an exemplary pneumatic-powered tool, in a forward operating position, in accordance with implementations described herein.

FIGS. 6A-6D illustrate an exemplary valve assembly of an exemplary pneumatic-powered tool, in a reverse operating position, in accordance with implementations described herein.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION

Figure 1A:
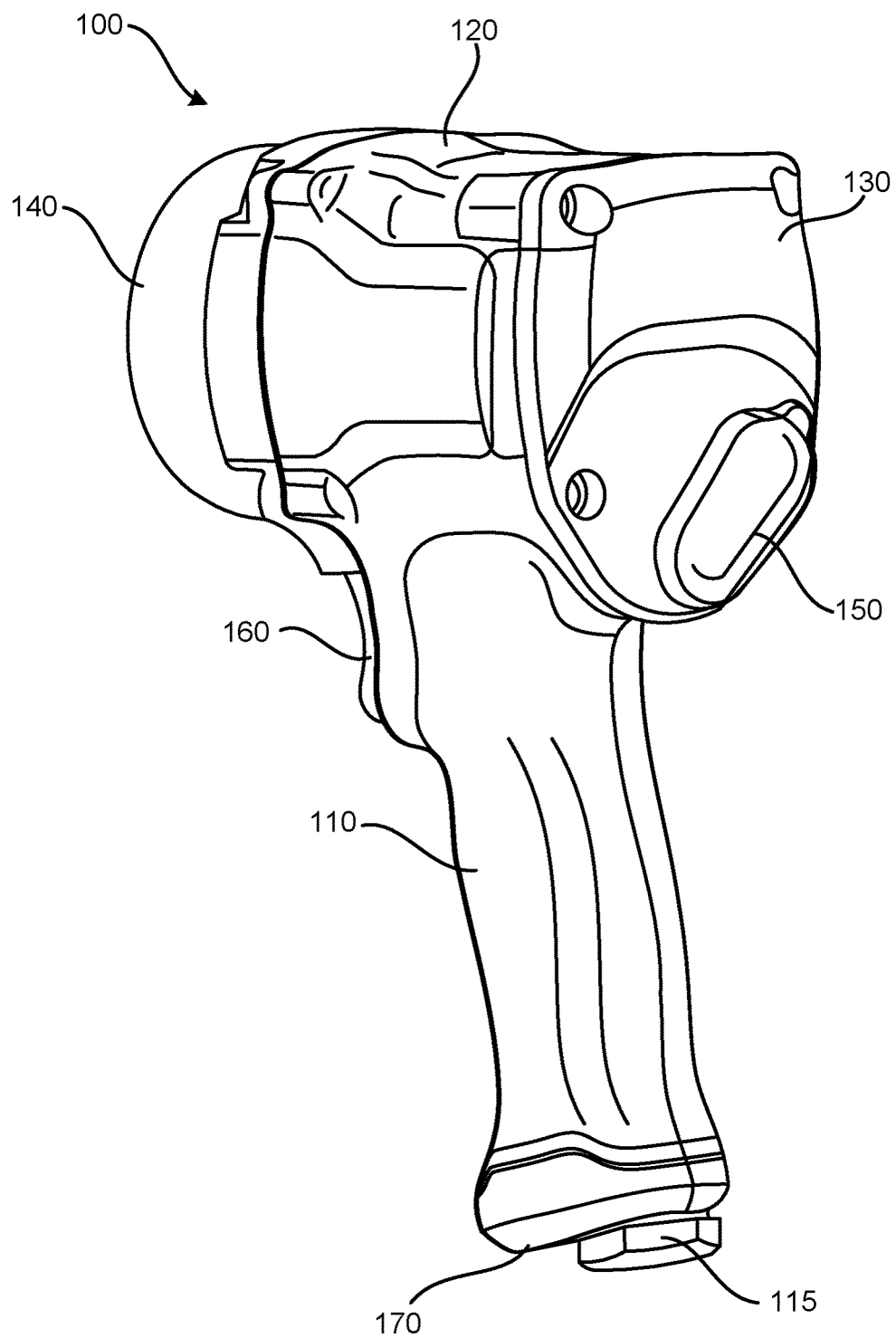
FIGS. 1A-1C are perspective views of an exemplary pneumatic-powered tool, in accordance with implementations described herein.
Figure 1B:
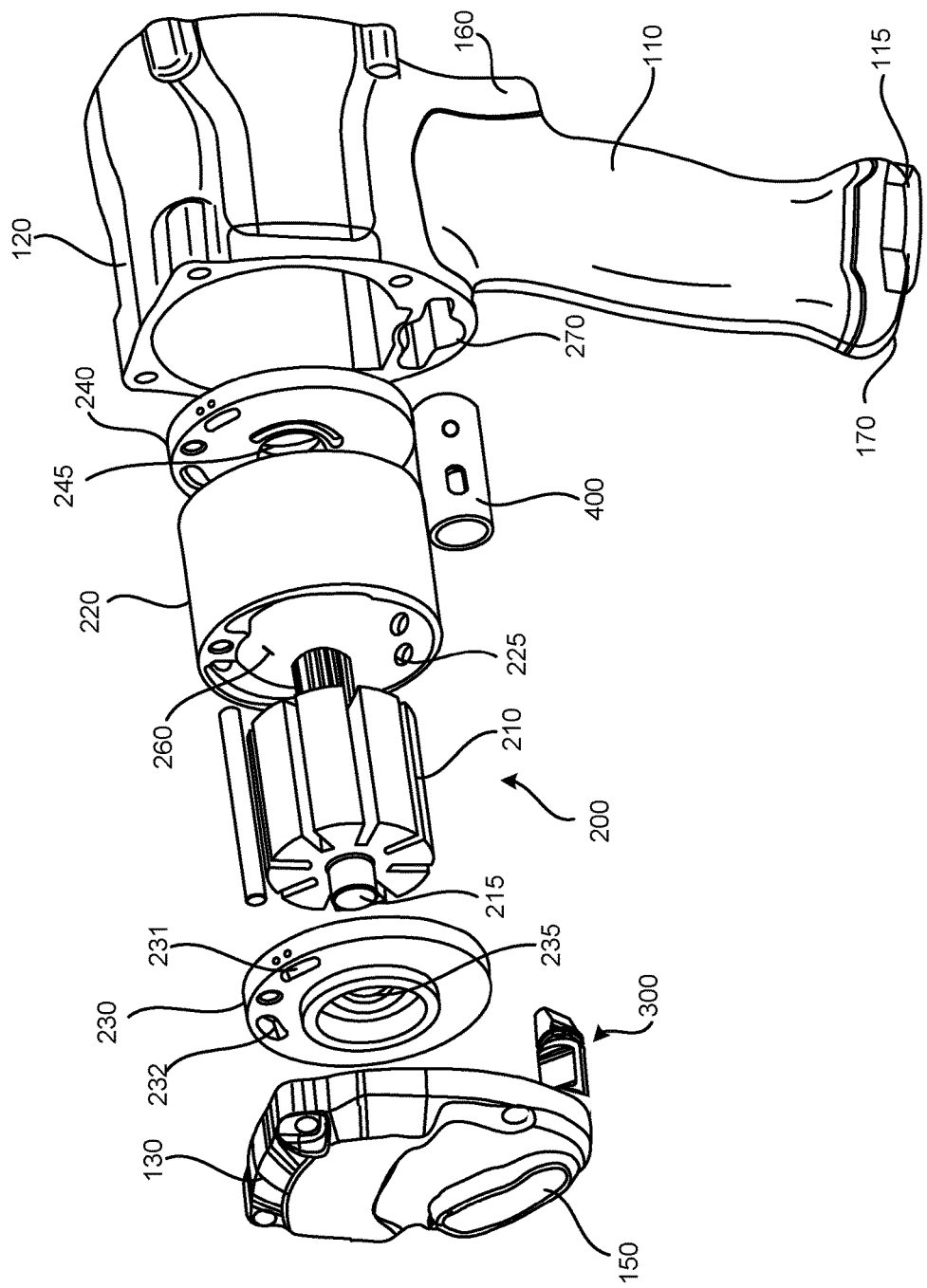
Figure 1C:
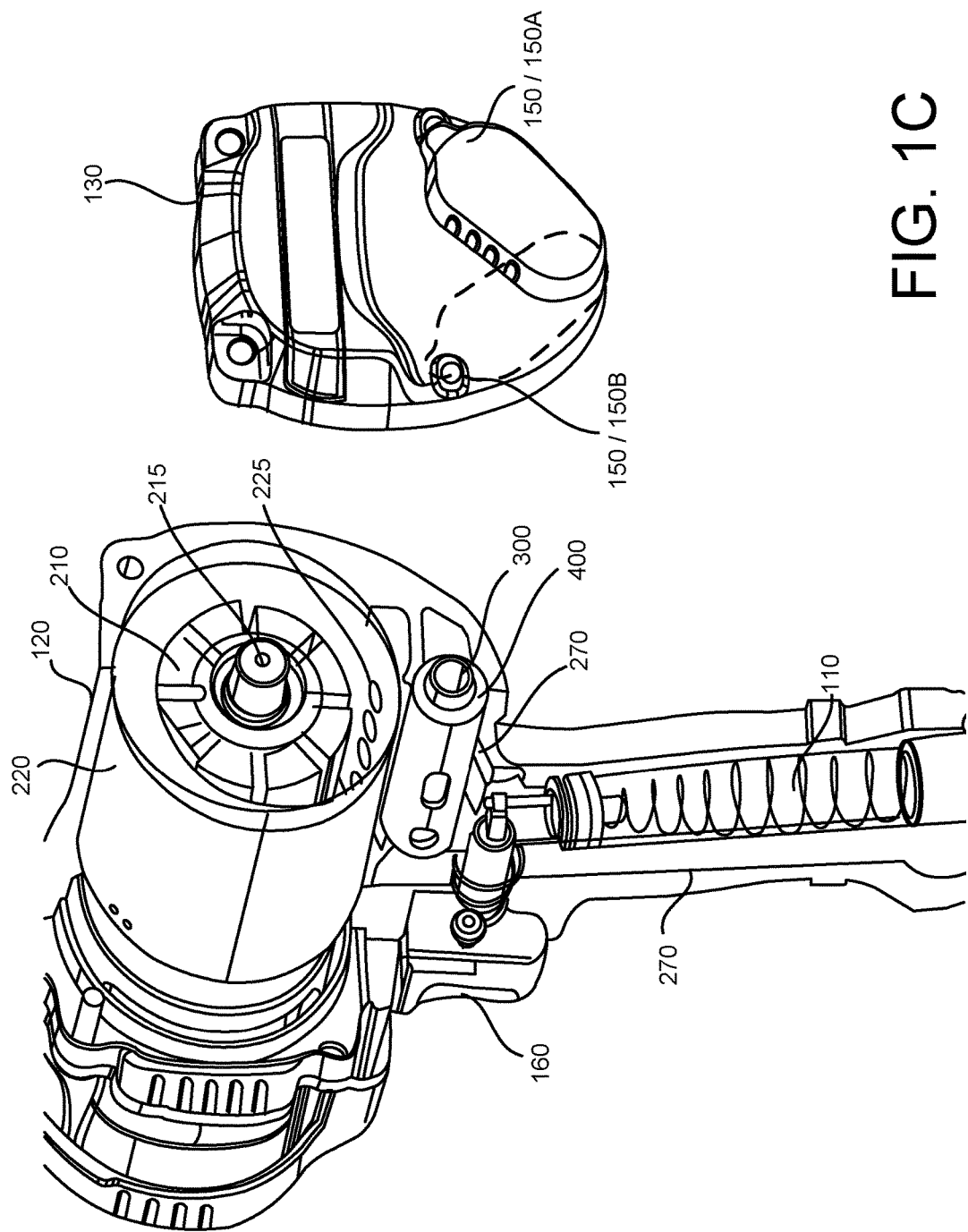

An example implementation of a pneumatic-powered tool 100 is shown in FIGS. 1A-1C. The example tool 100 illustrated in FIGS. 1A-1C is a handheld pneumatic-powered impact wrench, simply for ease of discussion and illustration. However, the principles to be described herein may be applied to other types of pneumatic tools that are operable in different modes such as, for example, a forward mode and a reverse mode.

As illustrated in the perspective view shown in FIG. 1A, the example tool 100 may include a housing 120 including a handle portion 110. A rear housing cover 130 may enclose a rear end portion of the housing 120. A front housing cover 140 may enclose a front end portion of the housing 120. A switch 150 may be coupled to the rear housing cover 130. The switch 150 may be manipulatable by a user, allowing the user to select a mode of operation, such as, for example operation of the tool 100 in the forward mode and/or operation of the tool 100 in the reverse mode. A supply of power, for example, pneumatic power, or compressed air, to operate the tool 100 may be controlled through selective operation of a trigger 160 provided, for example, on a portion of the handle 110. A compressed air inlet 115 may be included, for example, at an end portion of the handle 110, to introduce compressed air, provided from an external source, into the tool 100. A discharge air outlet 170 may be included, for example, at an end portion of the handle 110, to discharge air from the tool 100. In some implementations, the tool 100 may operate in multiple modes, such as, for example, a forward mode and a reverse mode, based on a flow of compressed air through the tool 100 and a corresponding direction of a driving force provided by a drive system 200 (in FIG. 1B), or motor 200. A simplified, effective configuration for controlling the flow of air through the tool 100 in multiple directions, including, for example, a multi-directional valve, in accordance with implementations described herein, may enhance the efficiency and effectiveness, and overall performance of the tool 100.

As illustrated in the exploded perspective view shown in FIG. 1B and the partial cutaway view shown in FIG. 1C, a drive system 200, or motor 200, may be received in the housing 120. The drive system 200 may include a rotor 210 rotatably installed in a rotor sleeve 220. A first rotor cap 230 may be coupled to a first end portion of the rotor sleeve 220, between the rotor sleeve 220 and the rear housing cover 130. A second rotor cap 240 may be coupled to a second end portion of the rotor sleeve 220, between the rotor sleeve 220 and the housing 120. The rotor sleeve 220, first rotor cap 230 and second rotor cap 240 may be fixed in the housing 120, and may define a chamber 260 in which the rotor 210 is received. A shaft 215 may define an axis of rotation of the rotor 210 in the chamber 260. A first end portion of the shaft 215 may be received in a shaft opening 235 defined in the first rotor cap 230, and a second end portion of the shaft 215 may be received in a shaft opening 245 defined in the second rotor cap 240. The rotor 210 may rotate within the chamber 260 defined by the rotor sleeve 220 and the first and second end caps 230, 240, based on a direction of compressed air flowing through the chamber 260.

For example, the rotor 210 may rotate in a first direction, for example, a forward direction corresponding to operation of the tool 100 in the forward mode, in response to compressed air introduced into the chamber 260 through a first air passage 231 defined in the first rotor cap 230. The rotor 210 may rotate in a second direction, for example, a reverse direction corresponding to operation of the tool 100 in the reverse mode, in response to compressed air introduced into the chamber 260 through a second air passage 232 defined in the first rotor cap 230. At least a portion of the compressed air (introduced into the chamber 260 through either the first air passage 231 or the second air passage 232) may be discharged from the chamber 260 through one or more primary discharge openings 225 defined in the rotor sleeve 220.

A valve assembly may selectively provide compressed air to the drive system 200, or motor 200. In some implementations, the valve assembly may include a valve 300 rotatably coupled in a stationary valve sleeve 400. The valve 300 may be coupled to the switch 150, for example, through the rear housing cover 130. The valve sleeve 400 may be fixed in the housing 120, while allowing the valve 300 to move, for example, rotate, within the valve sleeve 400. The valve 300 may rotate in response to manipulation of the switch 150, to direct a flow of compressed air to the first air passage 231, or to the second air passage 232, and into the chamber 260. For example, the valve 300 may rotate together with the switch 150, as the switch 150 is moved between a first position 150A (corresponding to operation of the tool 100 in a first mode) and a second position 150B (corresponding to operation of the tool 100 in a second mode) as shown in FIG. 1C. Rotation of the switch 150 and the corresponding rotation of the valve 300 in this manner may selectively guide compressed air into the chamber 260 through the first air passage 231 to rotate the rotor 210 in the first direction (for example, the forward direction corresponding to operation of the tool 100 in the forward mode) when the switch 150 and the valve 300 are positioned in the first position 150A. Rotation of the switch 150 and corresponding rotation of the valve 300 in this manner may also selectively guide compressed air into the chamber 260 through the second air passage 232 to rotate the rotor 210 in the second direction (for example, the reverse direction corresponding to operation of the tool 100 in the reverse mode) when the switch 150 and the valve 300 are positioned in the second position 150B. Hereinafter, simply for ease of discussion and illustration, the first position 150A of the switch 150 will correspond to operation of the tool 100 in the forward mode, and the second position 150B of the switch 150 will correspond to operation of the tool 100 in the reverse mode.

FIG. 2A is a side view, and FIG. 2B is a bottom view, of the valve 300 coupled to the switch 150, in accordance with implementations described herein. As shown in FIGS. 2A and 2B, the valve 300 may include a valve body 310 having a proximal end portion coupled to the switch 150. Air inlet guide surfaces 320, for example, a first air inlet guide surface 320A and a second air inlet guide surface 320B, may be formed at opposite sides of an intermediate portion of the valve body 310. Each of the first and second air inlet guide surfaces 320A and 320B may include a substantially flat, transverse surface defining a cut out area of the valve body 310. An air discharge guide surface 330 may be formed at a distal end portion of the valve body 310. The air discharge guide surface 330 may be defined by an angled surface, or chamfer, at the distal end portion of the valve body 310.

FIG. 3A is a perspective view, and FIG. 3B is a bottom view, of the valve sleeve 400. As shown in FIGS. 3A and 3B, the valve sleeve 400 may include a sleeve body 410 configured to surround the valve body 310 when the valve 300 is received in the valve sleeve 400. A main air inlet slot 450 may be formed in the sleeve body 410, for example, at a bottom portion of the sleeve body 410 to guide compressed air, from an external compressed air source, from the compressed air inlet 115 into the valve 300 coupled in the valve sleeve 400. Air inlet guide slots 420, for example, a first air inlet guide slot 420A and a second air inlet guide slot 420B, may be formed at opposite sides of an intermediate portion of the sleeve body 410. A position of the air inlet guide slots 420 on the sleeve body 410 may correspond to a position of the air inlet guide surfaces 320 on the valve body 310 when the valve 300 is coupled in the valve sleeve 400. Air discharge guide openings 430, for example, a first air discharge guide opening 430A and a second air discharge guide opening 430B, may be formed at an end portion of the sleeve body 410. A position of the air discharge guide openings 430 on the sleeve body 410 may correspond to a position of the air discharge guide surface 330 on the valve body 310 when the valve 300 is coupled in the valve sleeve 400.

In the example valve sleeve 400 shown in FIGS. 3A and 3B, the air inlet guide slots 420 have an elongated oval shape, and the air discharge guide openings 430 have a circular shape. However, the air inlet guide slots 420 and/or the air discharge guide openings 430 may have other shapes/contours. In some implementations, an area of the air inlet guide slots 420 may be greater than an area of the air discharge guide openings 430, allowing for more air to be introduced into the air flow path to rotate the motor 200. For example, in some implementations, an area of each of the air inlet guide slots 420 may be greater than or equal to approximately 50 mm$^2$ and an area of each of the air discharge guide openings 430 may be less than or equal to approximately 30 mm$^2$. This is just one example of sizing of the air inlet guide slots 420 and air discharge guide openings 430. Other sizes and/or combinations of sizes may be applied to the air inlet guide slots 420 and/or air discharge guide openings 430, depending on, for example, a flow rate of compressed air through a particular tool, a power setting for a particular mode of operation, a size of a particular tool, and other such factors.

Figure 4C:
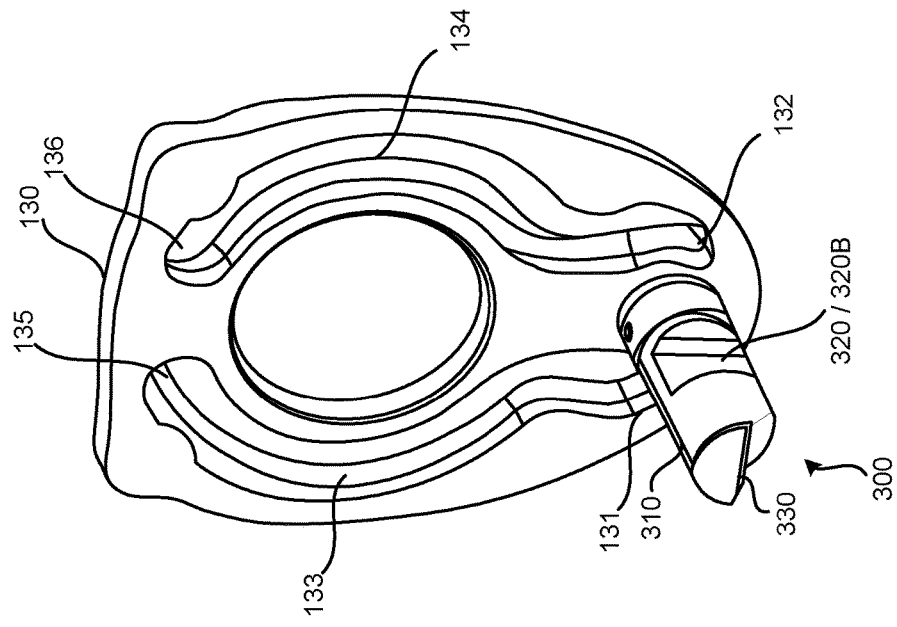
Figure 4B:
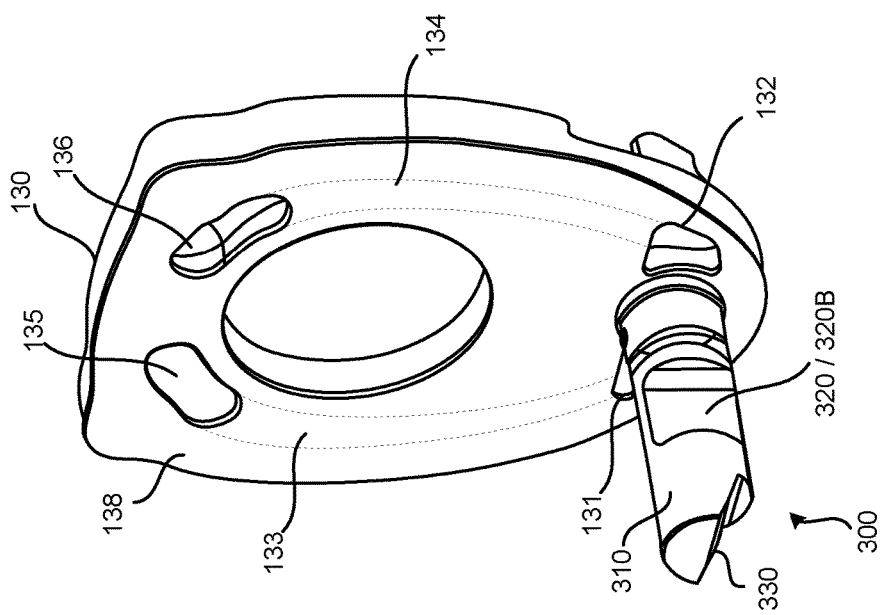

FIG. 4A is a plan view of an exterior facing side the rear housing cover 130, with the switch 150 (and the valve 300) in a neutral position 150C, between the first position 150A (corresponding to operation of the tool in the forward mode, in this example) and the second position 150B (corresponding to operation of the tool in the reverse mode, in this example). FIG. 4B is a perspective view of an interior facing side of the rear housing cover 130, with the valve 300 (and the switch 150) in the neutral position. FIG. 4C is a perspective view of the interior facing side of the rear housing cover 130, with an interior facing surface 138 of the rear housing cover 130 removed. A first air channel 133 and a second air channel 134 may be formed within the rear housing cover 130. The first air channel 133 may extend between a first air inlet 131 and a first air outlet 135 in the rear housing cover 130. The second air channel 134 may extend between a second air inlet 132 and a second air outlet 136 in the rear housing cover 130. In an assembled arrangement, a position of the first air outlet 135 of the rear housing cover 130 may correspond to a position of the first air passage 231 of the first rotor cap 230/chamber 260, and a position of the second air outlet 136 of the rear housing cover 130 may correspond to a position of the second air passage 232 of the first rotor cap 230/chamber 260.

Figure 6D:
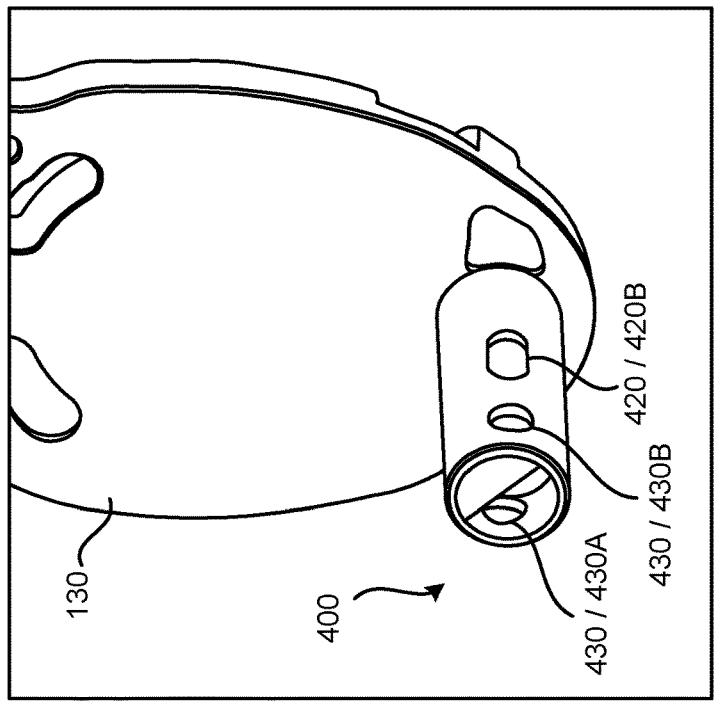
Figure 6C:
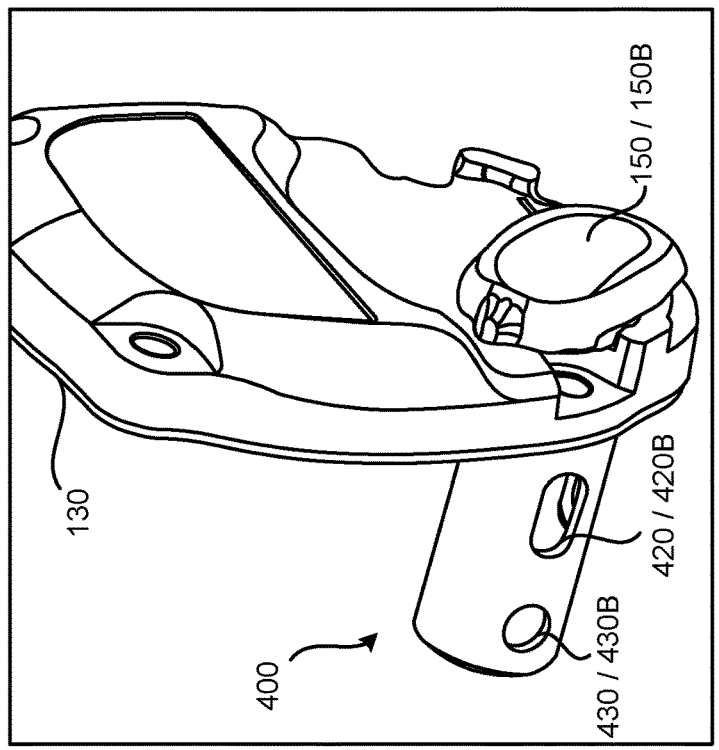

FIGS. 5A and 5B are right and left perspective views of the rear housing cover 130 with the switch 150 (and the valve 300) in the first position 150A, corresponding, in this example, to operation of the tool 100 in the forward mode. FIGS. 5C and 5D illustrate the valve 300 positioned in the valve sleeve 400, corresponding to the right and left perspective views of the rear housing cover 130 shown in FIGS. 5A and 5B. Similarly, FIGS. 6A and 6B are right and left perspective views of the rear housing cover 130 with the switch 150 (and the valve 300) in the second position 150B, corresponding, in this example, to operation of the tool 100 in the reverse mode. FIGS. 6C and 6D illustrate the valve 300 positioned in the valve sleeve 400, corresponding to the right and left perspective views of the rear housing cover 130 shown in FIGS. 6A and 6B. As noted above, the valve sleeve 400 remains in a fixed position in the tool housing 120, as shown in, for example, FIG. 1C, while the valve 300 rotates within the valve sleeve 400. The valve sleeve 400 is illustrated outside of the tool housing 120 in FIGS. 5C-5D to more clearly illustrate the positioning of the air inlet guide surfaces 320 and the air discharge guide surface 330 of the valve 300 relative to the positioning of the air inlet guide slots 420 and the air discharge guide openings 430 of the valve sleeve 400 during operation of the tool 100 in the forward mode. Similarly, the valve sleeve 400 is illustrated outside of the tool housing 120 in FIGS. 6C-6D to more clearly illustrate the positioning of the air inlet control surfaces 320 and the air discharge guide surface 330 of the valve 300 relative to the positioning of the air inlet guide slots 420 and the air discharge openings 430 of the valve sleeve 400 during operation of the tool in the reverse mode.

Figure 7A:
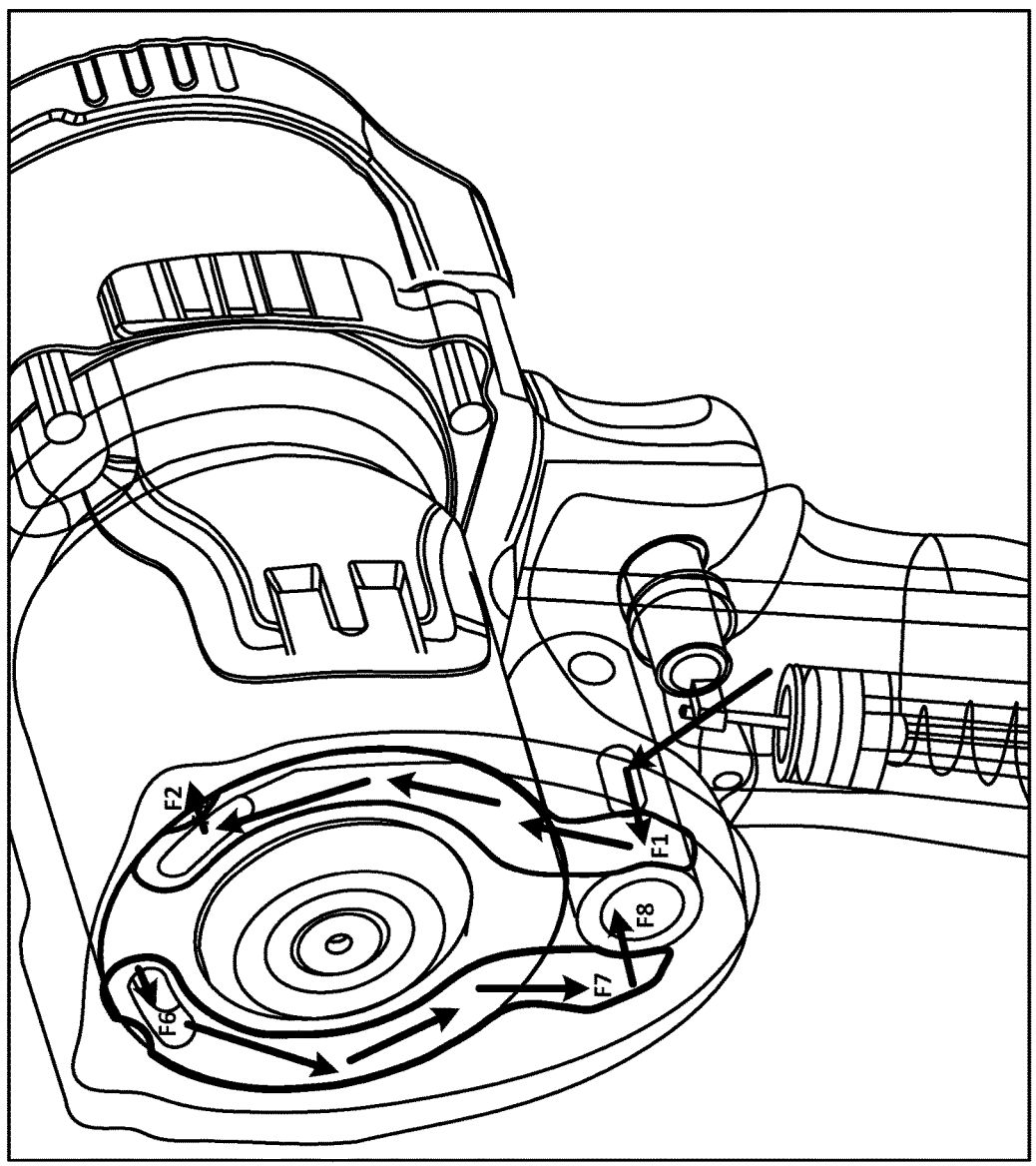
FIGS. 7A-7B illustrate a forward air flow path and a secondary exhaust air flow path through an exemplary pneumatic-powered tool, in accordance with implementations described herein.

When operating in the forward mode, as shown in FIGS. 5A-5D, the switch 150 is rotated to the first position 150A, and the valve 300 is also rotated (while the valve sleeve 400 remains stationary). In this arrangement, the second air inlet guide slot 420B and the first air discharge guide opening 430A are blocked by corresponding portions of the valve body 310, while the second air discharge guide opening 430B is open due to the chamfered surface of the air discharge guide surface 330. Compressed air may be introduced into the tool 100 from an external source through, for example, the compressed air inlet 115 provided in the handle 110. From the compressed air inlet 115, compressed air flows into the valve 300 through the main air inlet slot 450 in the valve sleeve 400. In this arrangement, the first air inlet guide surface 320A of the valve 300 is positioned at an angle that guides the compressed air out through the first air inlet guide slot 420A and into the first air channel 133 through the first air inlet 131, as illustrated by the arrow F1 shown in FIG. 7A. The compressed air travels out of the first air channel 133 through the first air outlet 135, and into the chamber 260 through the first air passage 231, as illustrated by the arrow F2 shown in FIGS. 7A and 7B. The compressed air introduced into the chamber 260 through the first air passage 231 causes the rotor 210 to rotate in the first direction, as illustrated by the arrow F3 shown in FIG. 7B. Rotation of the rotor 210 in the first direction may cause the tool 100 to operate in the forward mode, corresponding to the first position 150A of the switch 150 and corresponding position of the valve 300.

Figure 7B:
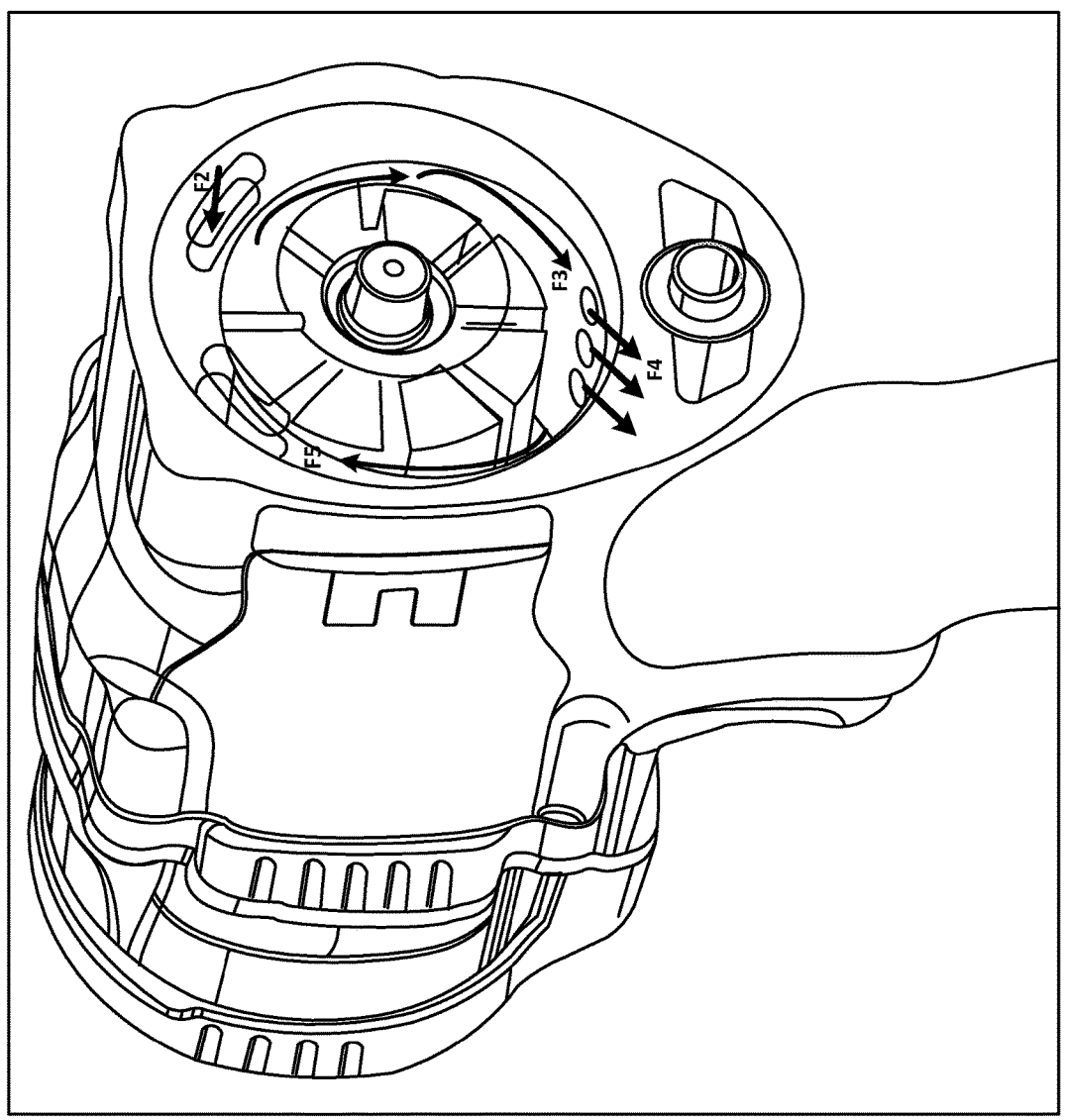

As the rotor 210 (see FIG. 1B) rotates in the first direction, as illustrated by the arrow F3 in FIG. 7B, in response to the continued introduction of compressed air into the chamber 260 through the first air passage 231 (see FIG. 1B), a portion of the compressed air is discharged out of the chamber 260 through the primary discharge openings 225 in the rotor sleeve 220, as illustrated by the arrow F4 in FIG. 7B and into a primary discharge channel 270 (see FIGS. 1B and 1C). Residual air, remaining in the chamber 260 beyond the primary discharge openings 225, illustrated by the arrow F5 in FIG. 7B, may be drawn out of the chamber 260 through the second air passage 232 (see FIG. 1B).

In this example, when operating the in the forward mode as described above with respect to FIGS. 5A-5D and 7A-7B, the second air passage 232 may function as a secondary discharge opening 232 (see FIG. 1B), and the second air channel 134 may function as a secondary discharge channel 134 (see FIGS. 4B-4C). For example, when operating in the forward mode, the residual air may be drawn from the chamber 260, through the second air inlet 232, or secondary discharge opening 232 (see FIG. 1B), as shown by the arrow F6 shown in FIG. 7A, and the second air channel 134, or secondary discharge channel 134 (see FIG. 4B), as shown by the arrow F7 in FIG. 7A, and into the valve 300 (see FIG. 1B), as shown by the arrow F8 in FIG. 7A. The residual air may be guided out of the valve 300 and into the primary discharge channel 270 by the air discharge guide surface 330 and the open second air discharge guide opening 430B, as discussed in detail above with respect to FIGS. 5A-5D. From the primary discharge channel 270, both the primary discharge air, and the residual discharge air, may be discharged from the tool 100, for example, through the primary discharge channel 270 extending through the handle 110 of the tool 100, and out through a discharge air port 170 (see FIGS. 1B-1C), or other arrangement based on the physical configuration of a particular tool.

When operating in the reverse mode, as shown in FIGS. 6A-6D, the switch 150 is rotated to the second position 150B, and the valve 300 is also rotated (while the valve sleeve 400 remains stationary). In this arrangement, the first air inlet guide slot 420A and the second air discharge guide opening 430B are blocked by corresponding portions of the valve body 310, while the first air discharge guide opening 430A is open due to the chamfered surface of the air discharge guide surface 330. Compressed air flows into the valve 300 through the main air inlet 450 of the sleeve 400, where the second air inlet guide surface 320B of the valve 300 is positioned at an angle that guides the compressed air out through the second air inlet guide slot 420B and into the second air channel 134 through the second air inlet 132, as illustrated by the arrow R1 shown in FIG. 7C. The compressed air travels out of the second air channel 134 through the second air outlet 136, and into the chamber 260 through the second air passage 232, as illustrated by the arrow R2 shown in FIGS. 7C and 7D. The compressed air introduced into the chamber 260 through the second air passage 232 rotates the rotor 210 in the second direction, as illustrated by the arrow R3 shown in FIG. 7D, to operate the tool 100 in the reverse mode.

Figure 7C:
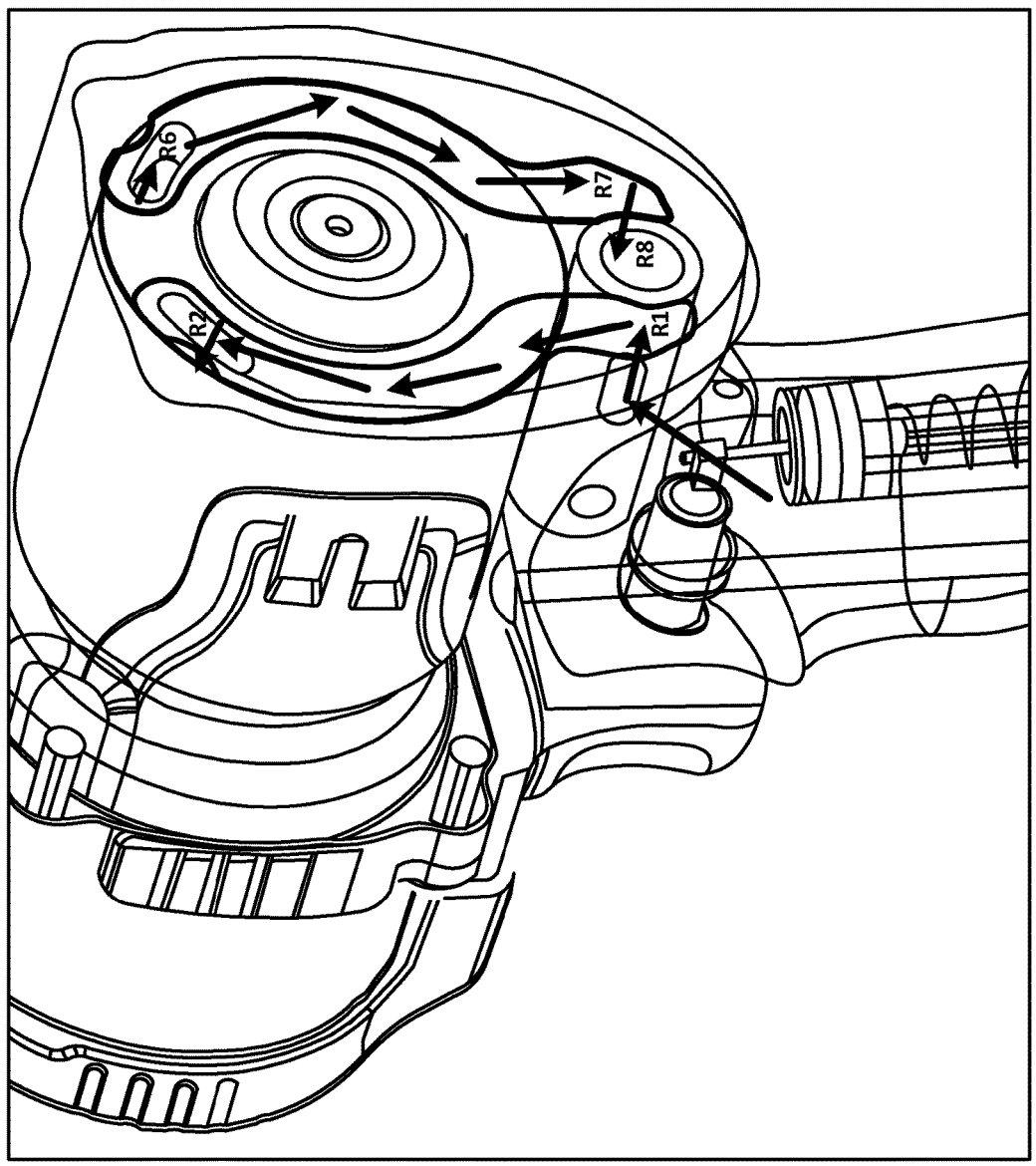
FIGS. 7C and 7D illustrate a reverse air flow path and a secondary exhaust air flow path through an exemplary pneumatic-powered tool, in accordance with implementations described herein.
Figure 7D:
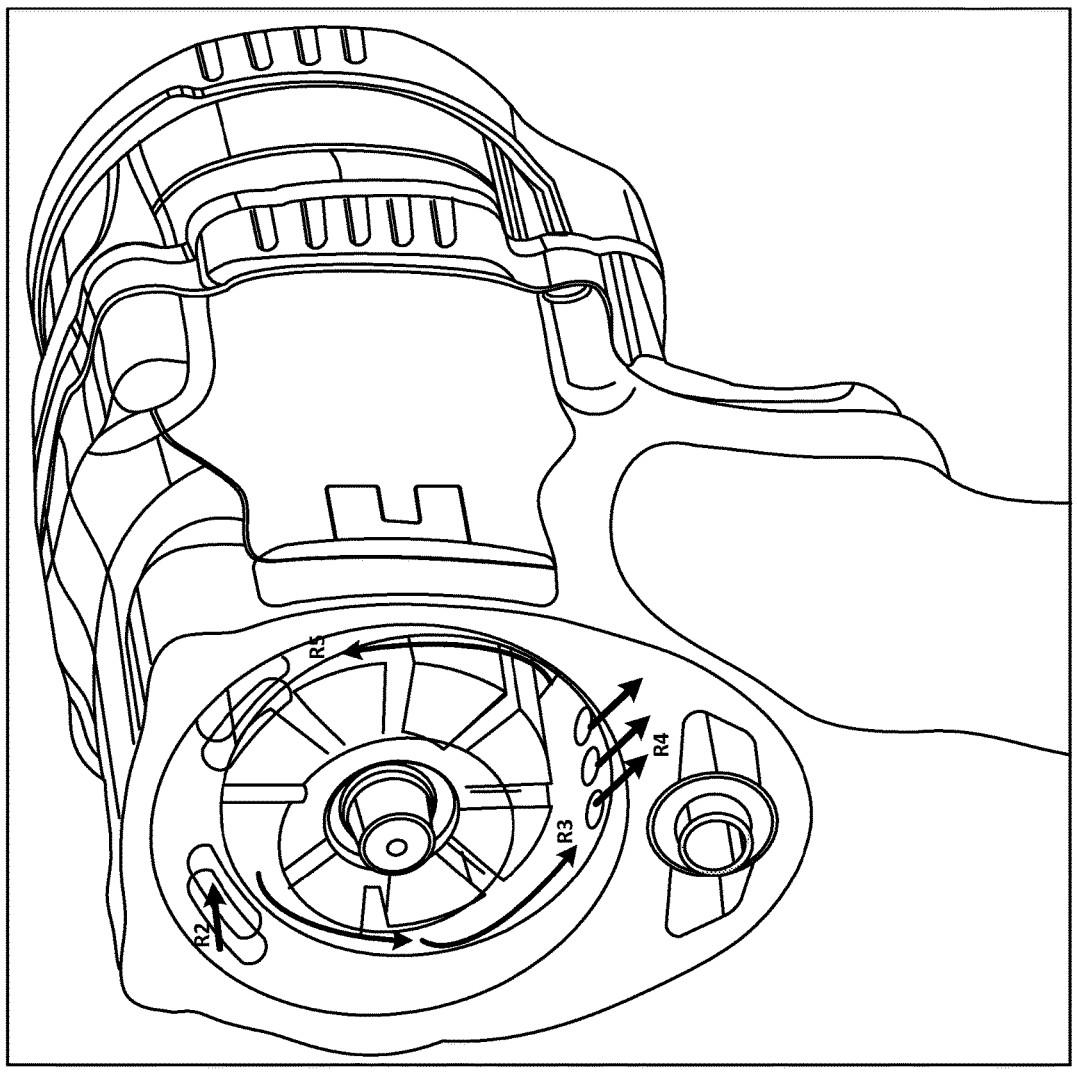

As the rotor 210 rotates in the second direction, as illustrated by the arrow R3 in FIG. 7D, in response to the continued introduction of compressed air into the chamber 260 through the second air passage 232, a portion of the compressed air is discharged out of the chamber 260 through the primary discharge openings 225 in the rotor sleeve 220, as illustrated by the arrow R4 in FIG. 7D and into the primary discharge channel 270. Residual air, remaining in the chamber 260 beyond the primary discharge openings 225, illustrated by the arrow R5 in FIG. 7D, may be drawn out of the chamber 260 through the first air passage 231.

When operating the in the reverse mode as described above with respect to FIGS. 6A-6D and 7C-7D, the first air passage 231 may function as a secondary discharge opening 231 (see FIG. 1B), and the first air channel 133 may function as a secondary discharge channel 133 (see FIGS. 4B-4C). For example, when operating in the reverse mode, the residual air may be drawn from the chamber 260, through the first air inlet 231, or secondary discharge opening 231 (see FIG. 1B), and the first air channel 133, or secondary discharge channel 133 (see FIG. 4B), and into the valve sleeve 400, then into the valve 300, as shown in FIG. 7C. The residual air may be guided out of the valve 300 and into the primary discharge channel 270 by the air discharge guide surface 330 and the open first air discharge guide opening 430A as described above with respect to FIGS. 6A-6D. From the primary discharge channel 270, both the primary discharge air, and the residual discharge air, may be discharged from the tool 100 as described above.

In some implementations, the tool 100 may be operated at different speeds in a certain mode. For example, in some implementations, the tool 100 may be capable of operation at a plurality of different speeds in the forward mode. This may be achieved by, for example, controlling an amount of compressed air, and/or a flow rate of compressed air, through the valve 300 and into the chamber 260 to rotate the motor 200. For example, a highest flow rate/highest speed may be achieved when the valve 300 is in a fully open position, in which the main air inlet slot 450 is fully open and not obstructed by a portion of the valve body 310. In some implementations, this may be achieved by, for example, a rotation of the valve 300 all the way to the first position 150A of the switch 150. In some implementations, this may reflect a rotation of approximately 45 degrees from the neutral position 150C. Intermediate speeds, for example, between this highest speed and the neutral position setting may be achieved by, for example, partial rotation of the valve 300, in which portions of the valve body 310 may partially obstruct flow of air through the main air inlet slot 450.

In a pneumatic-powered tool, in accordance with implementations described herein, compressed air may follow a first flow path through the tool to rotate the motor in the first (for example, forward) direction and operate the tool in the first (for example, forward) mode. Compressed air may follow a second flow path through the tool to rotate the motor in the second (for example, reverse) direction and operate the tool in the second (for example, reverse) mode. The compressed air flowing into the tool may be directed along the first flow path, or along the second flow path, based on a position of a valve relative to a valve sleeve controlling the direction of incoming compressed air. In particular, incoming compressed air may be directed along the first flow path or along the second flow path, based on positions of a plurality of air inlet guide surfaces of the valve relative to a corresponding plurality of air inlet guide slots of the valve sleeve. Air may be discharged from a chamber in which the motor rotates along a primary discharge path, and along a secondary discharge path, for discharge from the tool through a primary discharge channel. During operation in the first mode, as air flows along the first flow path, a portion of the second flow path may serve as the secondary discharge path. During operation in the second mode, as air flows along the second flow path, a portion of the first flow path may serve as the secondary discharge path.

A valve rotatably coupled in a valve sleeve, in accordance with implementations as described herein, may include first and second air inlet guide surfaces that direct incoming air through a corresponding first or second air inlet guide slot formed in the valve sleeve, depending on a position of the valve relative to the valve sleeve. The first and second air inlet guide surfaces may include substantially flat transverse surfaces defining cut out areas at an intermediate portion of the valve. The valve may also include an air discharge guide surface, including a chamfered surface formed at a distal end portion of the valve. The air discharge guide surface may be selectively aligned with a first or second air discharge opening in the valve sleeve, to direct secondary discharge air into a primary discharge channel for discharge from the tool.

In a pneumatic-powered tool, in accordance with implementations described herein, the flat, transverse air inlet guide surfaces of the valve may be relatively easily aligned with the air inlet guide slots formed in the valve sleeve. This may provide for a relatively simple, reliable and efficient way to direct air flow through the tool in a desired direction, using a valve and a valve sleeve configuration that are relatively simple to manufacture and assemble, enhancing performance and reliability of the tool.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A pneumatic-powered tool, comprising:
   a housing;
   a motor installed in the housing, including:
      a rotor sleeve; and
      a rotor rotatably positioned in the rotor sleeve;
   a valve assembly selectively providing compressed air to the motor, the valve assembly including:
      a valve sleeve received in the housing, the valve sleeve including:
         a main inlet slot defined in a bottom portion of the valve sleeve;
         a first inlet guide slot defined in a first side of the valve sleeve;
         a second inlet guide slot defined in a second side of the valve sleeve;
         a first discharge guide opening defined in the first side of the valve sleeve; and
         a second discharge guide opening defined in the second side of the valve sleeve; and
      a valve rotatably received in the valve sleeve, the valve including:
         a valve body;
         a first inlet guide surface defined in a first side of the valve body;
         a second inlet guide surface defined in a second side of the valve body; and
         a discharge guide surface defined by a chamfer at a distal end portion of the valve body.

2. The tool of claim 1, wherein
   the first inlet guide slot is defined in a first side of an intermediate portion of the valve sleeve,
   the second inlet guide slot is defined in a second side of the intermediate portion of the valve sleeve,
   the first discharge guide opening is defined in a first side of a distal end portion of the valve sleeve,
   the second discharge guide opening is defined in a second side of the distal end portion of the valve sleeve, and
   the main inlet is defined in the bottom portion of the valve sleeve, at a position corresponding to the first discharge guide opening and the second discharge guide opening.

3. The tool of claim 2, wherein the second side of the intermediate portion of the valve sleeve is opposite the first side of the intermediate portion of the valve sleeve.

4. The tool of claim 2, wherein
   the first inlet guide surface includes a flat transverse surface defined in a first side of an intermediate portion of the valve body, and
   the second inlet guide surface includes a flat transverse surface defined in a second side of the intermediate portion of the valve body.

5. The tool of claim 4, wherein the second side of the intermediate portion of the valve body is opposite the first side of the intermediate portion of the valve sleeve.

6. The tool of claim 4, wherein, with the valve received in the valve sleeve,
   a position of the first inlet guide surface of the valve corresponds to a position of the first inlet guide slot of the valve sleeve,
   a position of the second inlet guide surface of the valve corresponds to a position of the second inlet guide slot of the valve sleeve, and
   a position of the discharge guide surface of the valve corresponds to a position of the first discharge guide opening and the second discharge guide opening of the valve sleeve.

7. The tool of claim 4, further comprising:
   a first rotor cap coupled to a first end portion of the rotor sleeve;
   a second rotor cap coupled to a second end portion of the rotor sleeve, the rotor sleeve, the first end cap and the second end cap defining a chamber in which the rotor is rotatably received; and
   a first air passage and a second air passage formed in the first rotor cap.

8. The tool of claim 7, further comprising:
   a first air channel defined in an end portion of the housing, extending between a first inlet and a first outlet formed in an interior facing side of the end portion of the housing; and
   a second air channel defined in the end portion of the housing, extending between a second inlet and a second outlet formed in the interior facing side of the end portion of the housing.

9. The tool of claim 8, wherein, in a first position of the valve,
   the first inlet guide surface is aligned with the first inlet guide slot, so as to guide air from the valve through the first inlet guide slot, into the first air channel through the first inlet, and into the chamber through the first air passage, to rotate the rotor in a first direction; and
   the second inlet guide slot is blocked by a corresponding portion of the valve body.

10. The tool of claim 9, wherein, in the first position of the valve,
    the first discharge guide opening is blocked by a corresponding portion of the valve body; and
    the discharge guide surface is aligned with the second discharge guide opening, so as to guide air, discharged from the chamber through the second air passage and the second air channel, from the valve into a main discharge channel.

11. The tool of claim 8, wherein, in a second position of the valve,
    the second inlet guide surface is aligned with the second inlet guide slot, so as to guide air from the valve through the second inlet guide slot, into the second air channel through the second inlet, and into the chamber through the second air passage, to rotate the rotor in a second direction; and
    the first inlet guide slot is blocked by a corresponding portion of the valve body.

12. The tool of claim 11, wherein, in the second position of the valve, the second discharge guide opening is blocked by a corresponding portion of the valve body; and the discharge guide surface is aligned with the first discharge guide opening, so as to guide air, discharged from the chamber through the first air passage and the first air channel, from the valve into a main discharge channel.

13. The tool of claim 1, wherein an area of the first inlet guide slot is greater than an area of the first discharge guide opening, an area of the first inlet guide slot is greater than an area of the second discharge guide opening, an area of the second inlet guide slot is greater than an area of the second discharge guide opening, and an area of the second inlet guide slot is greater than an area of the first discharge guide opening.

14. A pneumatic-powered tool, comprising:
a motor including a rotor rotatably coupled in a rotor chamber installed in a housing;
a compressed air inlet and an air discharge outlet formed in the housing;
a first air flow path defined in the housing, the first air flow path guiding compressed air to the rotor chamber to rotate the rotor in a first direction;
a second air flow path defined in the housing, the second air flow path guiding compressed air to the rotor chamber to rotate the rotor in a second direction; and
a valve assembly selectively controlling a supply of compressed air from the compressed air inlet to the first air flow path or the second air flow path, the valve assembly including:
a valve sleeve installed in the housing; and
a valve body rotatably received in the valve sleeve,
wherein, in a first position of the valve body relative to the valve sleeve,
a first inlet guide surface defined in a first side of the valve body is aligned with a first inlet guide slot defined in a first side of the valve sleeve so as to guide compressed air out of the valve assembly through the first inlet guide slot and into the first air flow path, and a second inlet guide slot defined in a second side of the valve sleeve is blocked by a corresponding portion of the valve body, and
in a second position of the valve body relative to the valve sleeve,
a second inlet guide surface defined in a second side of the valve body is aligned with the second inlet guide slot defined in the second side of the valve sleeve so as to guide compressed air out of the valve assembly through the second inlet guide slot and into the second air flow path, and the first inlet guide slot defined in the first side of the valve sleeve is blocked by a corresponding portion of the valve body.

15. The tool of claim 14, wherein,
in the first position of the valve body relative to the valve sleeve,
a first discharge guide opening defined in the first side of the valve sleeve is blocked by a corresponding portion of the valve body, and a discharge guide surface defined by a chamfered surface at a distal end portion of the valve body is aligned with a second discharge guide opening defined in the second side of the valve sleeve, so as to guide residual air, discharged from the chamber, into a main discharge channel, and in the second position of the valve body relative to the valve sleeve,
a second discharge guide opening defined in the second side of the valve sleeve is blocked by a corresponding portion of the valve body, and the discharge guide surface is aligned with a first discharge guide opening defined in the first side of the valve sleeve, so as to guide residual air, discharged from the chamber, into the main discharge channel.

16. The tool of claim 15, wherein
the first inlet guide surface includes a flat transverse surface defined in a first side of an intermediate portion of the valve body, and
the second inlet guide surface includes a flat transverse surface defined in a second side of the intermediate portion of the valve body, opposite the first side thereof.

17. The tool of claim 16, wherein the valve body is symmetric with respect to a vertical plane defined by a longitudinal axis of the valve body, and the valve sleeve is symmetric with respect to a vertical plane defined by a longitudinal axis of the valve sleeve.

18. The tool of claim 15, wherein the first flow path includes a primary discharge path and a secondary discharge path,
wherein the primary discharge path is defined by a plurality of primary air discharge openings formed in a wall of the chamber, the plurality of primary air discharge openings guiding air from the chamber into a main discharge channel for discharge from the housing through the air discharge outlet, and
the secondary discharge path guides residual air from an upper portion of the chamber, through a secondary discharge channel formed in the housing, into the valve, wherein the discharge guide surface guides the residual air from the valve into the main discharge channel through the second discharge opening in the valve sleeve.

19. The tool of claim 15, wherein the second flow path includes a primary discharge path and a secondary discharge path,
wherein the primary discharge path is defined by a plurality of primary air discharge openings formed in a wall of the chamber, the plurality of primary air discharge openings guiding air from the chamber into a main discharge channel for discharge from the housing through the air discharge outlet, and
the secondary discharge path guides residual air from an upper portion of the chamber, through a secondary discharge channel formed in the housing, into the valve, where the discharge guide surface of the valve body guides the residual air from the valve into the main discharge channel through the first discharge opening in the valve sleeve.

20. The tool of claim 15, wherein an area of the first inlet guide slot is greater than an area of the first discharge guide opening, an area of the first inlet guide slot is greater than an area of the second discharge guide opening, an area of the second inlet guide slot is greater than an area of the second discharge guide opening, and an area of the second inlet guide slot is greater than an area of the first discharge guide opening.

* * * * *